Jan. 1, 1952          C. L. ANDREW          2,580,390

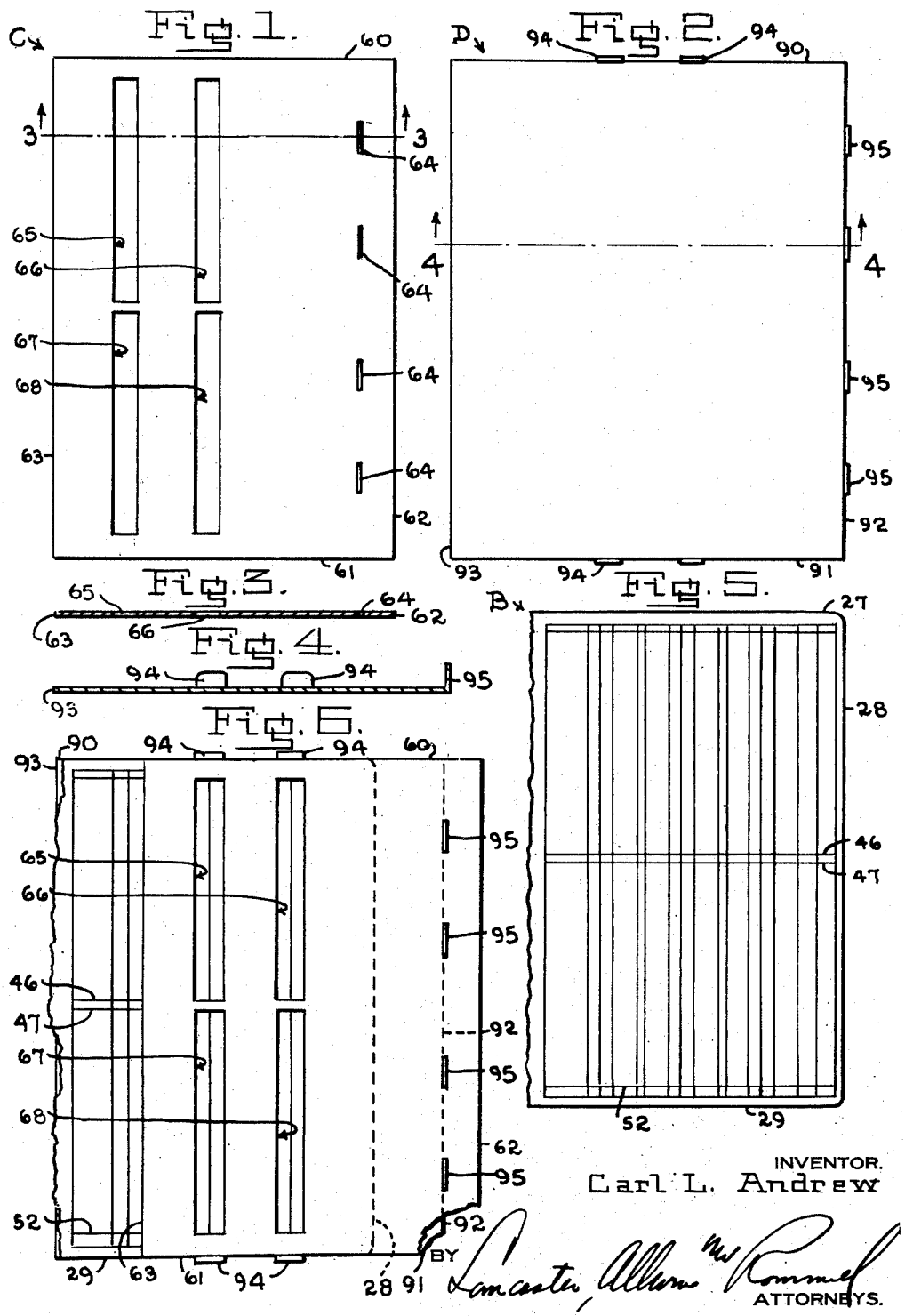

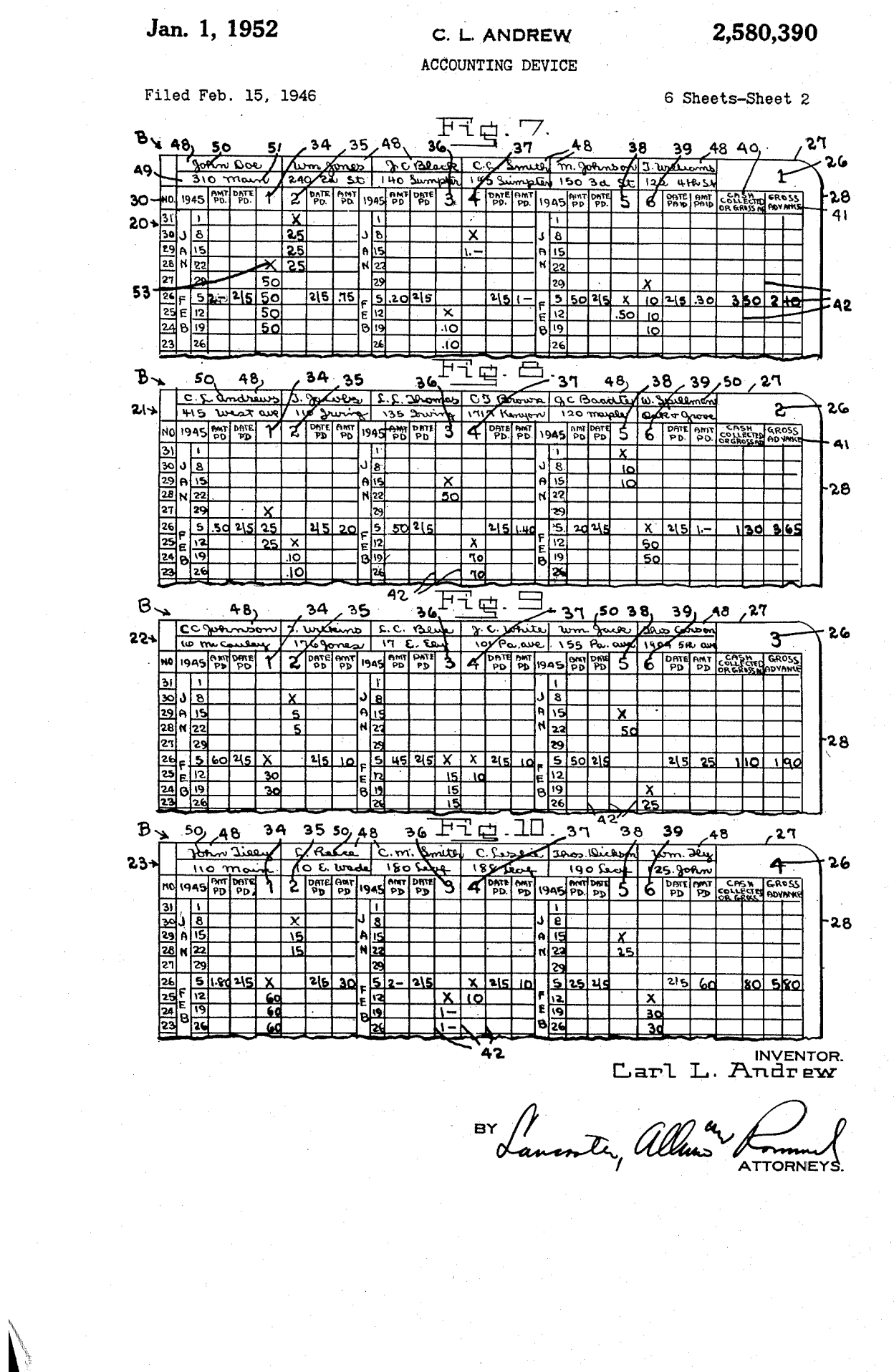

ACCOUNTING DEVICE

Filed Feb. 15, 1946          6 Sheets-Sheet 2

INVENTOR.
Carl L. Andrew

BY *Lancaster, Allwine Rommel*

ATTORNEYS.

Jan. 1, 1952            C. L. ANDREW            2,580,390
ACCOUNTING DEVICE
Filed Feb. 15, 1946                                            6 Sheets-Sheet 3
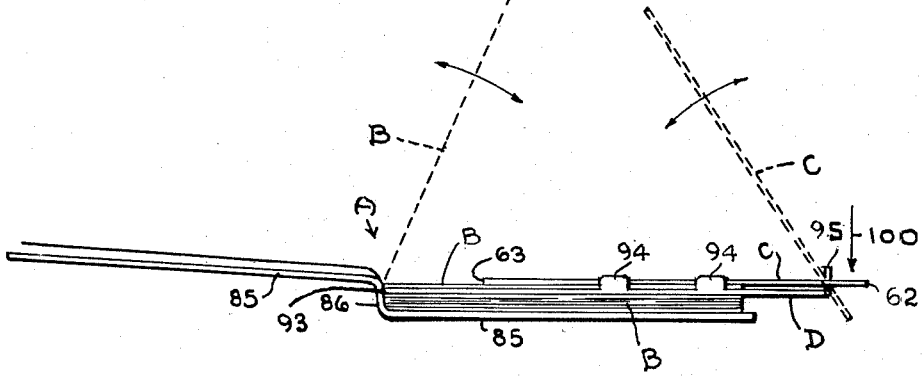
INVENTOR.
Carl L. Andrew
BY Lancaster, Allwine & Rommel
ATTORNEYS.

Figures 14, 15:
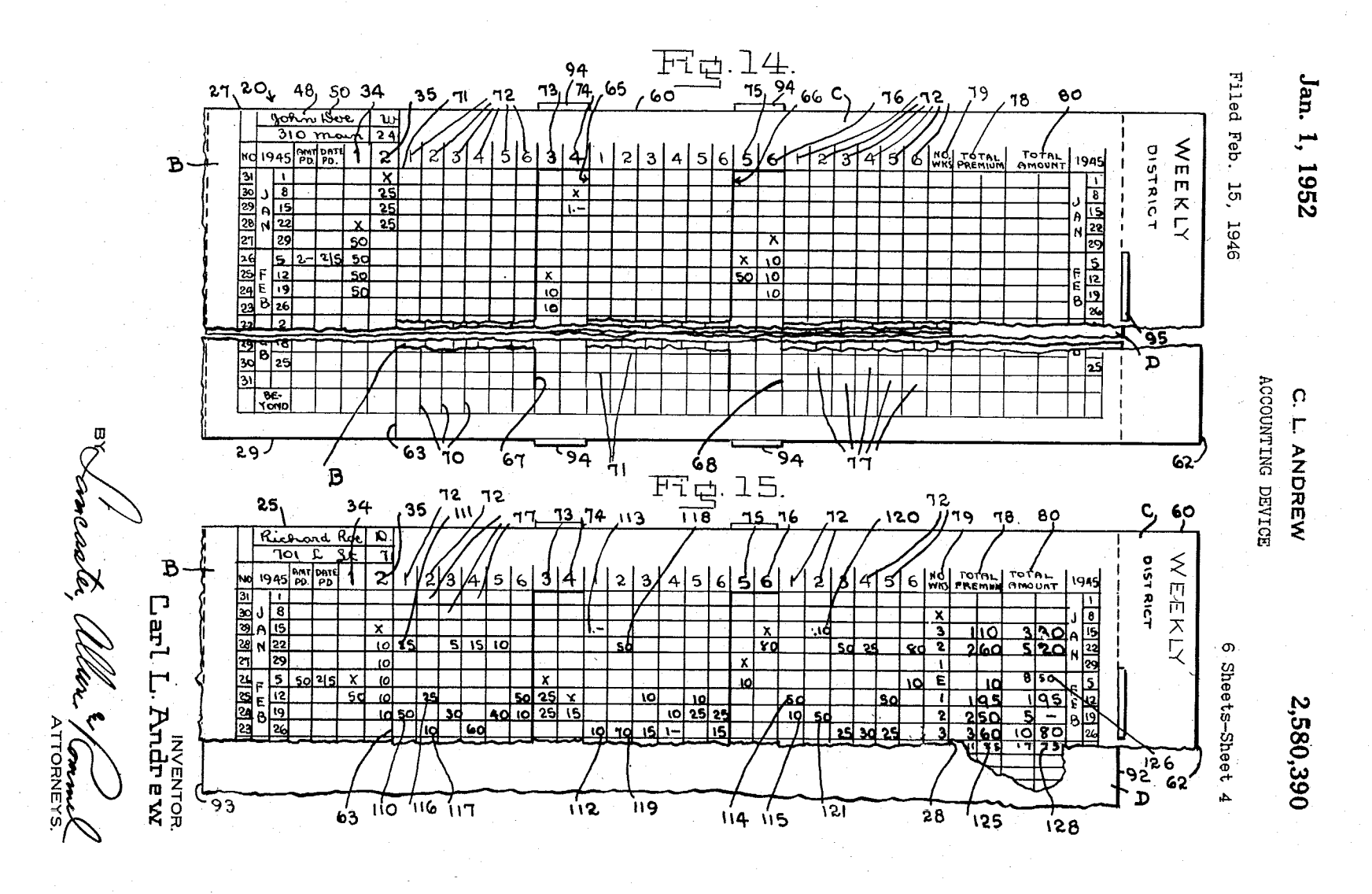

Jan. 1, 1952 — C. L. ANDREW — 2,580,390
ACCOUNTING DEVICE
Filed Feb. 15, 1946 — 6 Sheets-Sheet 4

INVENTOR.
Carl L. Andrew
BY Lancaster, Allwine & Rommel
ATTORNEYS.

Jan. 1, 1952     C. L. ANDREW     2,580,390
ACCOUNTING DEVICE
Filed Feb. 15, 1946     6 Sheets—Sheet 5
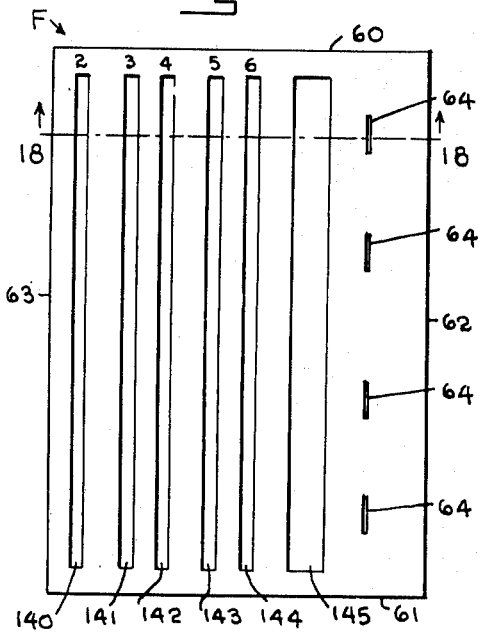
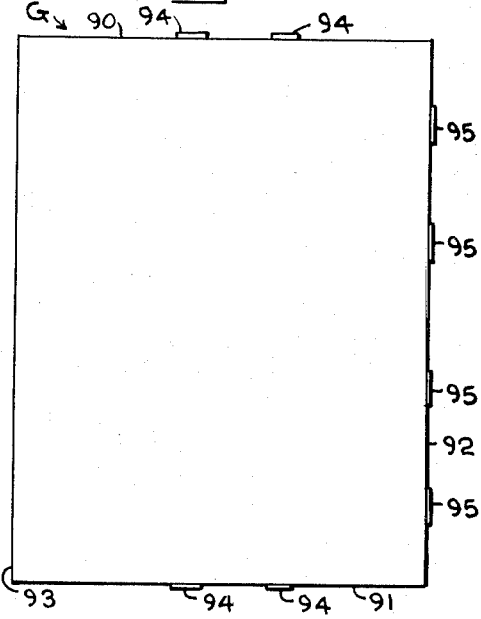
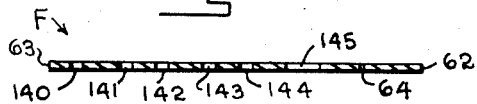
INVENTOR.
Carl L. Andrew
BY
ATTORNEYS.

Jan. 1, 1952           C. L. ANDREW           2,580,390
ACCOUNTING DEVICE
Filed Feb. 15, 1946           6 Sheets-Sheet 6
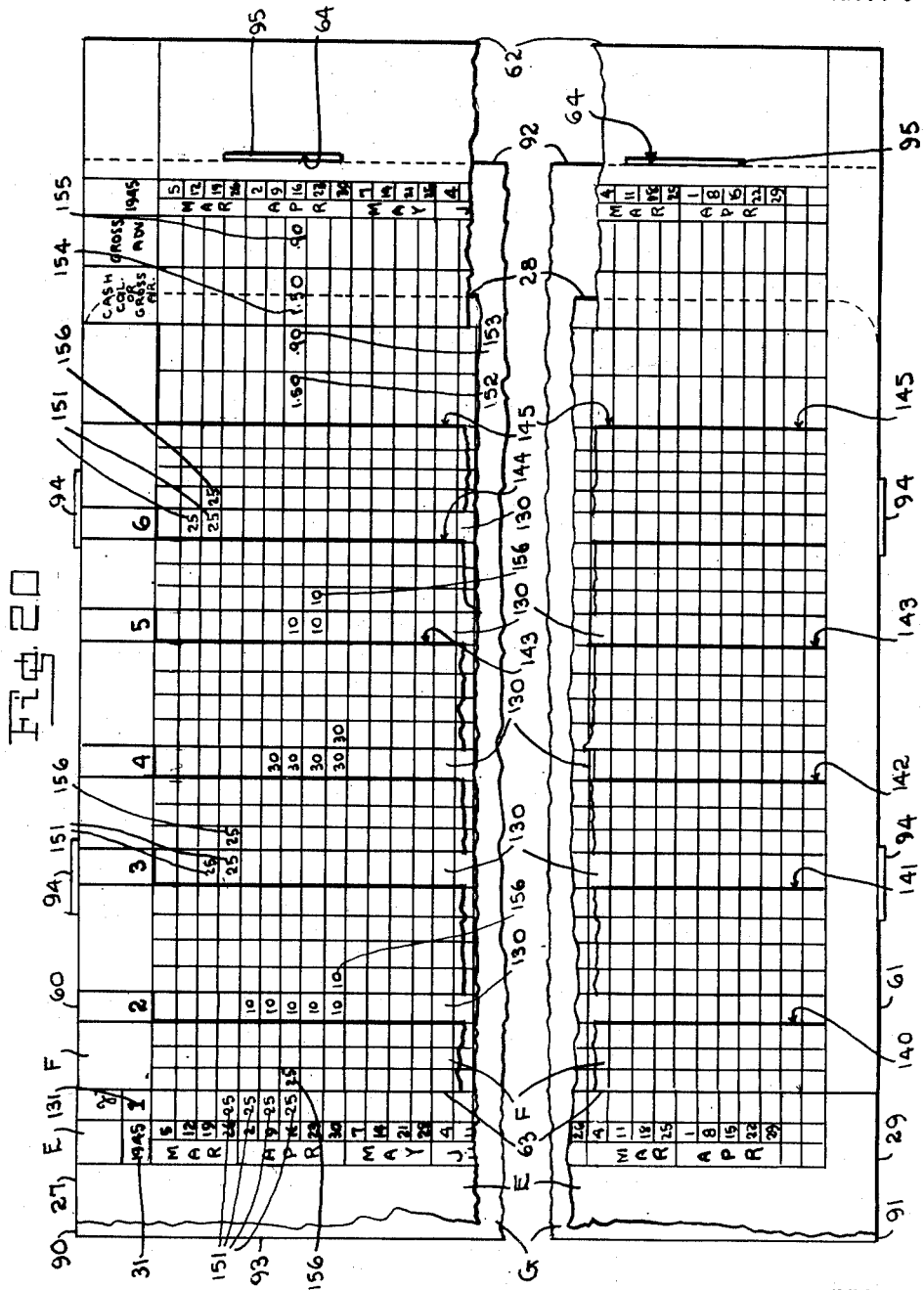
INVENTOR.
Carl L. Andrew
BY
ATTORNEYS.

Patented Jan. 1, 1952

2,580,390

UNITED STATES PATENT OFFICE 2,580,390

ACCOUNTING DEVICE

Carl L. Andrew, Greenville, S. C., assignor of one-half to Edward B. Smith, Greenville, S. C.

Application February 15, 1946, Serial No. 647,927

2 Claims. (Cl. 281—44)

This invention relates to accounting forms and a method of employing accounting forms. An example of the use of the forms and method is in the insurance field.

An important object of the invention is to provide novel forms for use by insurance agents or other persons in calling various wanted totals arrived at from data contained in records kept by the agent or others. For instance, in the insurance field, the agent may call the gross advance and gross arrears in collections on insurance premiums, by the employment of the novel forms much quicker and more accurately than by conventional methods.

Another important object of the invention is to provide a new method for quickly and accurately reaching certain desired totals from figures spread upon record sheets, such as the pages of insurance premium collection books.

Other objects and advantages of the invention will be apparent during the course of the following detailed description of the invention taken in connection with the accompanying drawings, forming a part of this specification, and in which drawings:

Figures 1, 2, 5 and 6 are plan views, but reduced in size, of various of the novel forms.

Figure 1 is a plan view of one form employed, being a blanking-out and entry sheet, but without any data or indicia thereon.

Figure 2 is a plan view of another of the forms, being a platen, which is disposed below and cooperates with the form of Figure 1.

Figures 3 and 4 are transverse sections upon their respective lines of Figures 1 and 2.

Figure 5 is a plan view of a third form or entry sheet, showing certain lines thereon, in order that they may be identified in conjunction with the assembly of the forms of Figures 1, 2 and 5, as shown in Figure 6, in which the form of Figure 5 is disposed beneath the form of Figure 1 and is disposed above the form of Figure 2.

Figures 7 to 12 inclusive are enlarged plan views of fragments of the form of Figure 5, and contain certain indicia thereon, in addition to the lines of Figure 5.

Figure 13 is a bottom edge view of the record and collection book, containing the sheets or forms of Figures 7 to 12 inclusive, with the forms of Figures 1 and 2 inserted therein.

Figure 14 is a plan view of the fragment of the form of Figure 7 and enlarged fragments of the upper portions of the forms of Figures 1 and 2.

Figure 15 is a plan view of the fragment of the form of Figure 12 and enlarged fragments of the upper portions of the forms of Figures 1 and 2.

Figure 16 is a fragmentary section of a modified embodiment of the form or entry sheet of Figs. 5 and 7 to 12.

Figure 17 is a plan view on a reduced scale of a modified embodiment of the form or blanking-out and entry sheet, designated hereinafter as C, shown in Figs. 1, 14 and 15.

Figure 18 is a transverse section thereof.

Figure 19 is a view on a reduced scale of a modified embodiment of the showing in Figure 2.

Figure 20 is a fragmentary plan view of portions of the forms of Figures 16 to 19 inclusive.

In the drawings, wherein for the purpose of illustration is shown a preferred embodiment of the invention and wherein similar reference characters designate corresponding parts throughout the several views, the letter A designates the forms as a whole; B the form or entry sheet of Figures 7 to 12 inclusive; C the form or blanking-out and entry sheet of Figure 1; D the form or platen of Figure 2; E the form of Figure 16; F, the form or blanking-out and entry sheet of Figures 17 and 18; and G, the form or platen of Figure 19.

The entry sheets B of Figures 7 to 12 inclusive are, preferably, alike as to all the printed indicia thereon, except that there may be a different page number, and the several sheets are consecutively designated for the purpose of subsequent identification, by reference numerals 20 to 25 inclusive. The page number 26 of each sheet may be disposed adjacent the upper right hand juncture of the upper edge 27 and right-hand edge 28 of the same. The bottom edge 29 of the sheet is shown in Figures 5 and 14.

Printed indicia upon the entry sheet B preferably includes a plurality of boxed headings such as "No." 30, the year, such as "1945" 31, "Amt Pd." (amount paid) 32, "Date Pd." (date paid) 33, large numerals 1 to 6 inclusive and designated consecutively as 34 to 39, "Cash Collected or Gross Ar." (cash collected or gross arrears) 40, and "Gross Advance" 41. Extending downwardly from these boxes are suitable paralleling lines, generally designated as 42. Below the boxes containing the indicia 30, may be a column of figures 43 denoting days of the month, and below the boxes containing the indicia 31 may be abbreviations 44 of the months of the year as well as week-apart collection dates 45. For convenience, the paralleling horizontal lines 46 and 47 of Figure 5 may be employed, in connection with the lines 42 to form a plurality of boxes to contain indicia similar to the headings 30 to 41. Of course, below these last-named headings, the printed indicia 43, 34 and 35 may be continued or repeated. Above the upper row of boxed headings may be boxes 48 and 49 adapted to contain the written-in names 50 and addresses 51 of the insured, whose payments on insurance policies may be entered in the appropriate columns below. It will be noted in Figures 7 to 12 that there is shown, by way of example, six name boxes 48 to each of the several sheets B designated as 20 to 25, and that there are six related groups of headings. For example, there are six headings 32 and 33, one of these two headings 32 and 33, being associated with each heading 34 to 39 inclusive. That is, the headings 32 and 33 to the left of the numeral 1 (heading 34) are associated, the headings 32 and 33 to the right of the numeral 2 (heading 35) are associated, and so on. The repetition of the date indicia is simply for convenience. Adjacent the bottom of the sheet B is a horizontal line 52.

It is well known that policy holders may make weekly or monthly payments on insurance premiums and that such payments are sometimes made in lump sums, which are multiples of regular weekly or monthly payments. The method herein described and the entry sheets B illustrated are adapted to weekly payments, whether week-by-week or in advance. For illustration, it will be noted in Figure 7 that John Doe, whose payment record is contained in the columns below the boxes containing grouped headings 32, 33 and 34, was paid up for the week of Jan. 22, 1945, as indicated by the "X" 53, and that on Feb. 5 of that year, he paid $2.00, which represented four fifty cent payments on policy or policies, which paid his premiums through the week of Feb. 19. From this, the system of recording payments on premiums is obvious.

It might be said that the totals under the headings 40 and 41 are arrived at as follows: Summing up all unpaid premiums beginning with the week following the week of last payment to and including the week under consideration (week of Feb. 5, 1945, in the example shown), the total is entered under heading 40 "Cash Collected or Total Ar." Adding up all payments in advance, as appearing on the entry sheet B after the broken down entries for the week of Feb. 5, 1945, and including blank spaces denoting advance payments previously made, covering any week subsequent to Feb. 5, 1945, the totals are entered under heading 41 "Gross Advance."

Referring now to blanking-out and entry sheet C of Figures 1, 3, 6, 13, 14 and 15, it will be noted that this sheet has upper and lower edges 60 and 61, a right hand edge 62 normal to the edges 60 and 61, and a left hand edge 63. The edges 60 and 61 are preferably spaced apart a distance equal to the distance between the edges 27 and 29 of entry sheet B. However, while the right hand edge 62 substantially parallels the right hand edge 28 of entry sheet B, it is spaced outwardly therefrom, as may be seen from the dotted lines in Figure 6 and from Figure 13. Inwardly of the edge 62 are a plurality of spaced-apart, longitudinally-extending, tongue-engaging slots 64 for a purpose later described.

As may be seen, particularly in Figures 13, 14 and 15, the left hand edge 63 of the blanking-out and entry sheet C, when that sheet is properly disposed, as will be described, extends only to the right-hand side of the column headed by indicia 35 (i. e. figure "2"). But spaced inwardly of the edge 63 are a plurality of relatively wide slots or longitudinally-extending openings 65 to 68 inclusive. Each slot 65 to 68 is substantially as wide as the combined width of the boxes containing headings 36 and 37 or 38 and 39. The length of each slot 65 and 66 is substantially the distance from the lower edge of the boxes containing the headings 36 and 37 (or 38 and 39) to the line 46 of Figure 5, while the length of each slot 67 and 68 is the same as the length of the slots 65 and 66, or from the line 47 to the line 52 of Figure 5.

Indicia contained on the blanking-out and entry sheet C is shown in Figures 14 and 15. Preferably, this comprises headings disposed within boxes adjacent the edge 60 and above the slots 65 and 68, formed by substantially parallel longitudinal lines 70 and the uppermost of substantially paralleling horizontal lines 71. These headings comprise the figures 1 to 6, indicated generally as 72, one to each box and repeated twice, each group of figures 1 to 6 being separated by heavier figures. These are the Figures 3 to 6 inclusive, designated as 73 to 76 inclusive, with two of the heavier figures disposed in the boxes above each of slots 65 and 67 (as the figures 3 and 4) and two of the heavier figures disposed in the boxes above each of the slots 66 and 68. It will be noted, by a comparison of Figures 7 to 12 inclusive with Figures 14 and 15 that the spacing of the slots 65 to 68 with respect to the edge 63 is that, when sheet C is properly disposed over sheet B, each of the slots 65 to 68 register with one of the columns below headings 36 and 37 or 38 and 39 of sheet B, so that written-in indicia upon sheet B within the space below headings 36 and 37 or 38 and 39 may be seen through the slots. Since the edge 63 of sheet C extends only to the right hand side of the column headed by indicia or heading 35 (i. e. figure "2"), any written-in indicia in this column, or that to the left thereof, may also be seen. Sheet C is employed to enable the agent or operator to blank out other indicia upon sheet B and observe and more readily total only certain of the indicia (entries) observed within the slots 65 to 68 and in the two columns next adjacent the edge 63. For assistance in this totalling, the spaces 77 below the headings 72 are provided as well as the spaces below the heading 78, "Total Premium." To the left of the heading 78 is a heading 79 "No. Wks." (number of weeks). In addition to the right of heading 78 may be a heading 80, "Total Amount." By observing the indicia below headings 78 and 79 it will be seen, in Figure 16, that the figures opposite each other in the columns headed in headings 78 and 79 when multiplied together will give the indicia to be written in in the column headed by heading 80.

The marginal space to the right of the narrow slots 64 and the edge 62 of blanking-out and entry sheet C serves two purposes. One is the provision of space for additional written-in indicia of appropriate scope, as the name of the agent, week covered, district and the like.

It is obvious that the rows of figures 1 to 6, contained three times on sheet B indicates that sheet B, shown by way of example, is adapted to cover data (indicia) contained on the six sheets B, designated as 20 to 25, or the equivalent of 6 right hand pages of a suitable book. Such a book may be one with fixed or loose-leaf pages. In Figure 13 a record and collection book is shown with covers 85 and back 86, containing a plurality of superposed sheets B.

Now as for platen D which comprises an important part of the invention. While entry sheet B may be a flexible sheet of suitable material, as paper, and blanking-out and entry sheet C of heavier, stiffer material as cardboard, platen D is, preferably, a thin sheet of suitable stiff rigid material, as metal. It is desirable that it be thin enough to be inserted between sheets B, such as may be bound in book form, and not cause any undesired bulging of the sheets B above the platen D. In Figure 13 it is shown inserted but, in order to clearly show it, it is made considerably thicker than in proportion to the thickness of the sheets B. It has an upper edge 90, lower edge 91, outer or right-hand edge 92 and inner or left-hand edge 93, the edges 90 and 91, 91 and 92 and 92 and 93 being normal to each other. The distance from edge 90 to edge 91 is substantially the same as the distance between edges 27 and 29 of sheet B (or edges 60 and 61 of blanking-out and entry sheet C). Extending upwardly from the edges 90 and 91 are suitably spaced-apart guides or stops 94 adapted to contact the edges 27, 29, 60 and 61 when form D is disposed with at least one sheet B upon it and a sheet C disposed upon the uppermost sheet B. The edge 93 is adapted to extend as far inwardly of a book, close to the back 86. Extending upwardly from the right-hand edge 90 of platen D are a plurality of spaced apart tongues 95 adapted to extend into the narrow slots 64 of sheet C. When sheet C is disposed with the tongues 95 within the slots 64 and sheet D is inserted under a sheet B as described, the slots 65 to 68 will register with the proper columns of sheet B as described, since the stops 94 tend to align the sheets B and C and platen. For instance, platen D may be inserted between pages 6 and 7 of a book of sheets B with pages 1 to 6 on top of platen D and sheet C on top of page 1. All that is required when it is desired to turn page 1 (20 of sheet B) is to place a finger of the right hand upon the marginal portion of sheet C, to the right of the narrow slots 65, and press down upon it, as indicated by the arrow 100 in Figure 13. Sheet C will then tilt, as shown by dotted lines in Figure 13, being guided by and pivoted upon the tongues 95, until the uppermost sheet B may be turned, also as shown by dotted lines in Figure 13, and the pressure of the finger then removed from the marginal portion of sheet C, whereupon sheet C will descend into place upon the then topmost form B. This can be repeated, as desired until all the necessary data is secured from the sixth sheet B, whereupon platen D may be withdrawn, carrying sheet C with it, platen D again inserted (this time between pages 12 and 13, for instance, and a proper sheet C be associated with platen D as described.

It has been said that the written-in data upon the entry sheets B may include the names and addresses of the insured, the lump sum payments and dates when made. In addition, the lump sum payments are broken down, as has been stated, and entered in the proper column headed by the headings 34 to 39, and it is these entries of broken down payments which are considered in making the records on sheet C.

In fact, all the indicia on the entry sheets B may be blanked out except these broken-down entries, and this blanking out is accomplished by positioning the sheet C as heretofore described. In Figure 14, the upper portion of this sheet C is shown as disposed upon the face of the unit 20, page 1, of sheet B, shown in Figure 7, with the entries in the columns or areas below the headings 34 to 39 exposed through the slots or openings 65 and 66 of sheet C. There have been no entries made, as yet, on sheet C. However, the operator or agent, will record upon sheet C the last entry only under each heading 34 to 39 in the columns below the heading 72 corresponding in number to the number of the page beneath (i. e. page 1). Therefore, in column 1 to the right of the two columns headed 1 and 2 (i. e., headings 34 and 35) he will record in the spaces 77 just opposite the last entries mentioned, the figure "50," indicated at 110 in Figure 15, being the broken-down entry upon the line leading from the indicia "Feb. 19" and the figure "25," indicated at 111 in Figure 15, being the broken-down entry upon the line leading from the indicia "Jan. 22." He will then make the records indicated at 112 and 113 and 114 and 115, as may be appreciated by a comparison of Figures 14 and 15. This completes the records as taken from page 1 (unit 20 of sheet B). By pressing down upon the marginal portion of sheet C as described until page 1 can be moved out of the way (turned), the sheet C will drop into proper place upon unit 21 of sheet B (page 2 shown in Figure 8), since its position is governed by the tongues 95 and guides 94. The six records made on sheet C, as taken from unit 21 are numbered 116 to 121 in Figure 15, and are, of course, all in columns headed "2." It is believed the method of recordings is now obvious.

Figure 15 illustrates the blanking-out and entry sheet C after all records are made thereon, as taken from the columns containing the headings 34 to 39, of all the units 20 to 25 (of Figures 7 to 12). After the "No. Weeks" (number of weeks) as determined from the week of the entries (week of Feb. 5) are entered in column containing the heading 79 and the various weekly entries on form C are totalled (below the heading 78 "Total Premium"), these totals are multiplied by the adjacent figure under heading 79, and the results entered in the column headed "Total Amount" (column heading 80). At appropriate times, these various totals may be added as at 125, 126 and 127.

In Figure 16 is shown a fragment of a modified embodiment of the entry sheet B of Figures 7 to 12 inclusive. This modified sheet is found desirable in many instances, and is designated as E. It may be provided with spaced-apart columns 130, headed by numerals, which may be similar to the numerals 1 to 6, designated by reference characters 34 to 39 of sheet B. There is shown, in Figure 18, six columns 130 each headed by one of the numerals 1 to 6 inclusive, and designated by reference characters 131 to 136. These columns are adapted for exactly the same use as are the columns headed by the numerals 1 to 6 of sheet B. Otherwise, the sheet E may be substantially like sheet B, with the minor exception that it is preferred to transpose the "No." heading 30 and its column from the left hand edge of the sheet to the left of the column headed "Cash Col. or Ar." designated as 40, and omit the paralleling horizontal lines 46 and 47 of sheet B and the indicia contained between them.

In Figures 17 and 18 is shown the form or blanking-out and entry sheet F which is somewhat like the sheet C of Figures 1, 14 and 15. Instead of the size and disposition of the slots 65 to 68 of sheet C, there is provided the five vertically-disposed, spaced-apart slots 140 to 144 inclusive, and the wider vertical slot 145 to the right of the slot 144. The slots 140 to 144 are headed, consecutively, by the numerals 2, 3, 4, 5 and 6 and are, of course, adapted to frame or expose the columns headed 2 to 6 inclusive of sheet E, with the column headed 1 of sheet E, immediately to the left of the left-hand margin 63 of the sheet F, when the sheet F is properly disposed upon sheet E. When so disposed the wider vertical slot 145 frames or exposes the indicia contained within the columns headed "Cash Col. and Gross Ar." and "Gross Advance" of sheet E. However, sheet F differs from sheet C, in that sheet F does not contain the columns nor their headings designated by the headings 78 and 80 of sheet C, i. e., "Total Premium" and "Total Amount."

To accommodate the sheet F of Figure 19 so that it will be properly disposed upon sheet E, as shown in Figure 20, the platen G, which may correspond, with a minor exception, with platen D of Figure 2, is provided. The exception is, of course, a slight narrowing of the platen G over that of platen D so that, when platen G is properly inserted into the book containing a number of sheets E, as has been described in connection with the description and use of platen D, the various columns will be exposed as stated.

Sheets E and F and platen G are particularly adapted, for example, in cases where two situations may be encountered. Ordinarily, the agent, after making entries on sheet E, like those designated by reference numerals 150, 151, 152 and 153 in Figure 16, simply copies, as at 154 and 155, the entries 152 and 153 in the proper columns and spaces on sheet F during his spare time, while making collections, etc., and hands in the sheet F to the proper office (such as a district office). However, when the office requests additional data, as when it is desired to audit or check the agent's account, then he may make the additional entries as 156 on sheet F in the columns to the right of the slots (as has been described in connection with the entries made in the columns to both sides of the slots 65 to 68 of sheet C). For this reason, the slots 140 to 145 of sheet F are provided as well as the columns to the right thereof. As is obvious, there is a relationship between the data in these columns and that in the columns headed "Cash Col. and Gross Ar." and "Gross Advance" of sheet F. Thus the use of sheets E and F and platen G provides a quick, time-saving method of furnishing data by the agent to his office since all of the data can be entered on sheet F between collections and immediately after collections are made.

It should be noted that there are no cumbersome parts to the accounting device, since the sheets D and F slip into the agent's collection books and are practically out of the way.

By the words "written-in" in the claims is meant indicia formed by pencil, ink, the typewriter or the like.

Various changes may be made to the forms of the invention herein shown and described, without departing from the spirit of the invention or scope of the claims.

What is claimed is:

1. An accounting device comprising a thin and substantially flat platen of rigid material having an upper face, a substantially straight left-hand edge, a substantially straight right-hand edge, with the two edges in parallelism, edges substantially normal to the right and left-hand edges, and a plurality of spaced-apart, thin and narrow tongues extending upwardly from said upper face at said right-hand edge and being substantially parallel with said right-hand edge, said platen being adapted to underlie entry sheets; and a blanking-out sheet comprising a thin, stiff sheet adapted to overlie said platen and an entry sheet, said blanking out sheet being provided with openings through which entries may be made on an entry sheet, and a portion of said blanking-out sheet extending substantially beyond the said right-hand edge of said platen and being provided with slots receiving said tongues, whereby downward pressure applied to said portion of said blanking-out sheet will cause said blanking-out sheet to pivot about said right-hand edge of said platen.

2. An accounting device comprising a thin and substantially flat platen of rigid material of a thinness sufficient so it may be inserted between the entry sheets of a book without causing appreciable bulging of the book, said platen having an upper face, a substantially straight left-hand edge, a substantially straight right-hand edge, with the two edges in parallelism, edges substantially normal to the right and left-hand edges, and a plurality of spaced-apart, thin and narrow tongues extending upwardly from said upper face at said right-hand edge and being substantially parallel with said right-hand edge, said platen being adapted to underlie entry sheets; and a blanking-out sheet comprising a thin, stiff sheet adapted to overlie said platen and an entry sheet, said blanking-out sheet being provided with openings through which entries may be made on an entry sheet, and a portion of said blanking-out sheet extending substantially beyond the said right-hand edge of said platen and being provided with slots receiving said tongues, whereby downward pressure applied to said portion of said blanking-out sheet will cause said blanking-out sheet to pivot about said right-hand edge of said platen, said platen being provided with upwardly-extending thin guides at its edges substantially normal to said left and right-hand edges to abut the upper and lower edges of said blanking-out sheet and entry-sheet.

CARL L. ANDREW.

REFERENCES CITED

The following references are of record in the file of this patent:

UNITED STATES PATENTS

| Number | Name | Date |
|---|---|---|
| 755,721 | Stonehouse | Mar. 29, 1904 |
| 1,449,045 | Hollander | Mar. 20, 1923 |